UNITED STATES PATENT OFFICE.

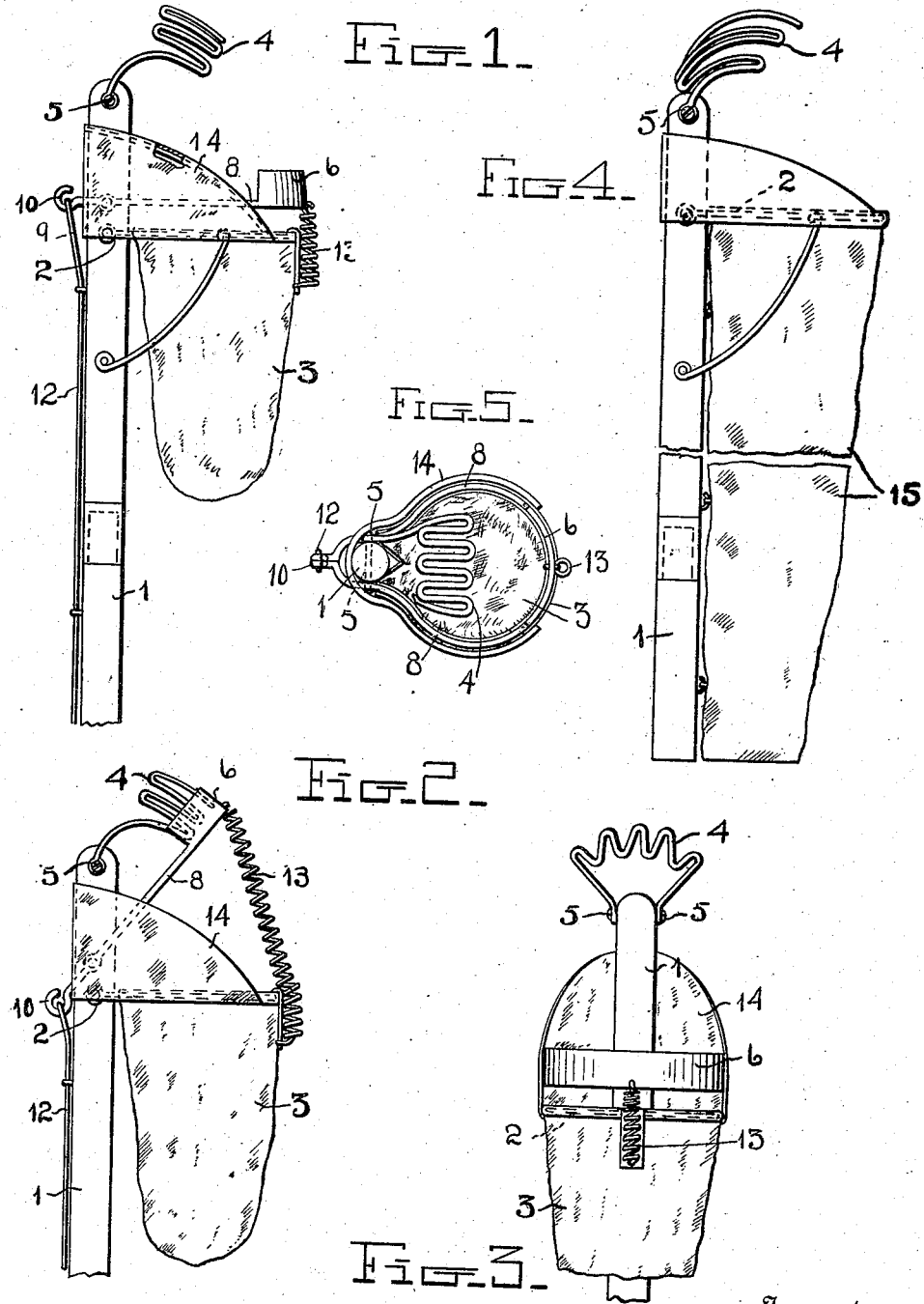

LAURA A. SAMPLE, OF WORTHINGTON, INDIANA.

FRUIT-PICKER.

No. 854,912.  Specification of Letters Patent.  Patented May 28, 1907.

Application filed September 24, 1906. Serial No. 335,932.

*To all whom it may concern:*

Be it known that I, LAURA A. SAMPLE, a citizeness of the United States, residing at Worthington, in the county of Greene and State of Indiana, have invented certain new and useful Improvements in Fruit-Pickers; and I do declare the following to be a full, clear, and exact description of the invention, such as will enable others skilled in the art to which it appertains to make and use the same.

This invention relates to improvements in fruit pickers.

The object of the invention is to provide a fruit picker having means whereby the fruit may be picked or severed from their stems and caught in a suitable receptacle without bruising or breaking the fruit.

With the above and other objects in view, the invention consists of certain novel features of construction, combination and arrangement of parts, as will be hereinafter described and claimed.

In the accompanying drawings:—Figure 1 is a side view of a fruit picker constructed in accordance with the invention, showing the parts in inoperative position; Fig. 2 is a similar view, showing the parts in position for picking the fruit; Fig. 3 is a front view of the device; and Fig. 4 is a side view of a modified form of the picker in which the severing blade or knife is dispensed with. Fig. 5 is a broken plan view of the device.

Referring more particularly to the drawings, 1 denotes the jointed handle or supporting rod of the picker, to the upper end of which is secured a ring 2, which projects at right angles to the rod or handle, as shown. To the ring 2 is secured a bag or receptacle 3, into which the fruit is adapted to fall after being picked. On the upper end of the handle 1 is secured a curved series of picking fingers 4, said fingers being preferably formed from a single piece of wire bent in the desired shape to form the same, the ends of the wire being secured to laterally-projecting studs 5 on the opposite sides of the handle 1 adjacent to its upper end.

Pivotally mounted on the handle immediately above the ring 2 is a cutting or severing blade 6, which is segmental in shape to conform to the shape of and to coact with the picking fingers 4 when brought into engagement therewith to sever the stems of the fruit engaged by said fingers. The cutting blade 6 is provided with inwardly projecting arms 8, by means of which the same is pivotally connected to studs 9 on the opposite sides of the rod or handle, said arms being extended rearwardly and brought together on the opposite side of the handle and bent into the form of a hook 10, with which is adapted to be attached the upper end of an operating cord 12, which extends downwardly through guide eyes or loops on the handle to within convenient reach of the operator. When the cord is drawn or pulled downwardly, the blade 6 will be swung upwardly over and into engagement with the upper side of the fingers 4, thus severing the stems caught by said fingers. Connected to the forward lower edge of the blade and to the adjacent portion of the ring 2 is a spring 13, by means of which said blade is retracted to its open or normal position when the cord 12 is released. If desired, I may provide a guard or fender 14 to keep the severed fruit from falling outside the ring 2. The guard 14 is preferably formed of suitable fabric supported upon a wire frame and connected at its lower edges with the ring 2, and arranged as shown in the drawings.

In Figs. 1, 2 and 3 of the drawings is shown the form of picker hereinbefore described, said form being particularly adapted for picking small fruits. In Fig. 4 of the drawings is shown a slightly modified construction of the picker. In this latter form, which is designed especially for picking large fruit, the severing blade 6 is dispensed with, the fruit being picked in this instance by the fingers 4. In the form of the device shown in Fig. 4, the bag or receptacle 3 is removed from the ring 2 and in place thereof is employed a flexible chute 15, preferably formed of suitable fabric and extending from the ring 2 to the ground. Said chute is secured at suitable intervals to the pole or handle 1, thereby holding the same in place to receive the fruit picked by the fingers 4 and to convey the same to the ground without bruising or injuring it.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A fruit picker comprising a handle, a bag or receptacle secured thereto, a series of segmental picking fingers arranged on the upper end of said handle, a spring-retracted severing blade to coact with said fingers, an operating cord connected to said blade, and a fender arranged partly around and extending above said receptacle, substantially as described.

2. In a fruit picker, a handle, a wire secured at its ends to the upper end thereof, the intermediate portion of the wire being bent into fingers, a blade, means pivotally secured to the handle for supporting the blade, a cord connected with said means for actuating the same, and a receptacle secured to the handle below the knife.

3. In a fruit picker, a handle, a series of fingers at the upper end thereof, a knife, arms pivotally secured near their ends to the handle for supporting the knife, a cord secured to said ends, a ring secured to the handle below the knife, a receptacle secured to the ring, and a spring secured to the central portions of the ring and knife respectively to return the latter to its retracted position.

4. In a fruit picker, a handle, a wire secured at its ends to the upper end thereof and having its intermediate portion bent in opposite directions to form fingers, a ring secured to the handle, a receptacle and a guard secured to the ring, and a wire frame for supporting the upper edge of the guard in such position as to cause the fruit to fall into the receptacle.

In testimony whereof I have hereunto set my hand in presence of two subscribing witnesses.

LAURA A. SAMPLE.

Witnesses:
 FRED E. DYER,
 L. M. WILKINS.